United States Patent
Kawamoto et al.

(10) Patent No.: US 8,150,444 B2
(45) Date of Patent: Apr. 3, 2012

(54) MOBILE COMMUNICATION METHOD, MOBILE COMMUNICATION SYSTEM AND RADIO NETWORK CONTROLLER

(75) Inventors: Junichiro Kawamoto, Tokyo (JP); Akihito Hanaki, Yokohama (JP); Takahiro Hayashi, Yokosuka (JP); Yoshikazu Goto, Yokohama (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 552 days.

(21) Appl. No.: 12/364,552

(22) Filed: Feb. 3, 2009

(65) Prior Publication Data
US 2009/0197633 A1    Aug. 6, 2009

(30) Foreign Application Priority Data
Feb. 5, 2008   (JP) ................ P2008-025605

(51) Int. Cl.
*H04B 7/00*   (2006.01)

(52) U.S. Cl. .................................... 455/522

(58) Field of Classification Search .......... None
See application file for complete search history.

(56) References Cited

U.S. PATENT DOCUMENTS
2006/0171342 A1*  8/2006  Dateki ................ 370/311

FOREIGN PATENT DOCUMENTS
| JP | 2000-278734 A | 10/2000 |
| JP | 2003-289564 A | 10/2003 |
| JP | 2004-080529 A | 3/2004 |

OTHER PUBLICATIONS

3GPP TS 25.211 V7.2.0 (May 2007), 3rd Generation Partnership Project; Technical Specification Group Radio Access Network; Physical channels and mapping of transport channels onto physical channels (FDD) (Release 7), 53 pages.

* cited by examiner

*Primary Examiner* — Lincoln Donovan
*Assistant Examiner* — Daniel Rojas
(74) *Attorney, Agent, or Firm* — Marvin A. Motsenbocker; Mots Law, PLLC (57) ABSTRACT

A mobile communication method includes: (A) assigning, at a radio network controller, a channelization code and a transmission timing for the mobile station on the basis of a status of use of a channelization code and a transmission timing in a sector other than a specific sector when the mobile station sets a radio link with the radio base station in the specific sector; and (B) notifying, from the radio base station, the mobile station of the transmission power control information via the transmission power control channel using the channelization code and the transmission timing assigned at the radio network controller.

7 Claims, 7 Drawing Sheets

| SLOT FORMAT | CHANNEL BIT RATE (Kbps) | CHANNEL SYMBOL RATE (Kbps) | SPREAD CODE | BIT PATTERN |
|---|---|---|---|---|
| 0 | 3 | 1.5 | 256 | 11 / 00 |

MOBILE COMMUNICATION METHOD, MOBILE COMMUNICATION SYSTEM AND RADIO NETWORK CONTROLLER

CROSS REFERENCE TO RELATED APPLICATION

This application is based upon and claims the benefit of priority from prior Japanese Patent Application No. 2008-025605, filed on Feb. 5, 2008; the entire contents of which are incorporated herein by reference.

BACKGROUND OF THE INVENTION

1. Field of the Invention

The present invention relates to a mobile communication method, a mobile communication system and a radio network controller with which a radio base station notifies a mobile station of transmission power control information via a transmission power control channel, the transmission power control information used in the mobile station to control transmission power of uplink user data.

2. Description of the Related Art

Figure 1:
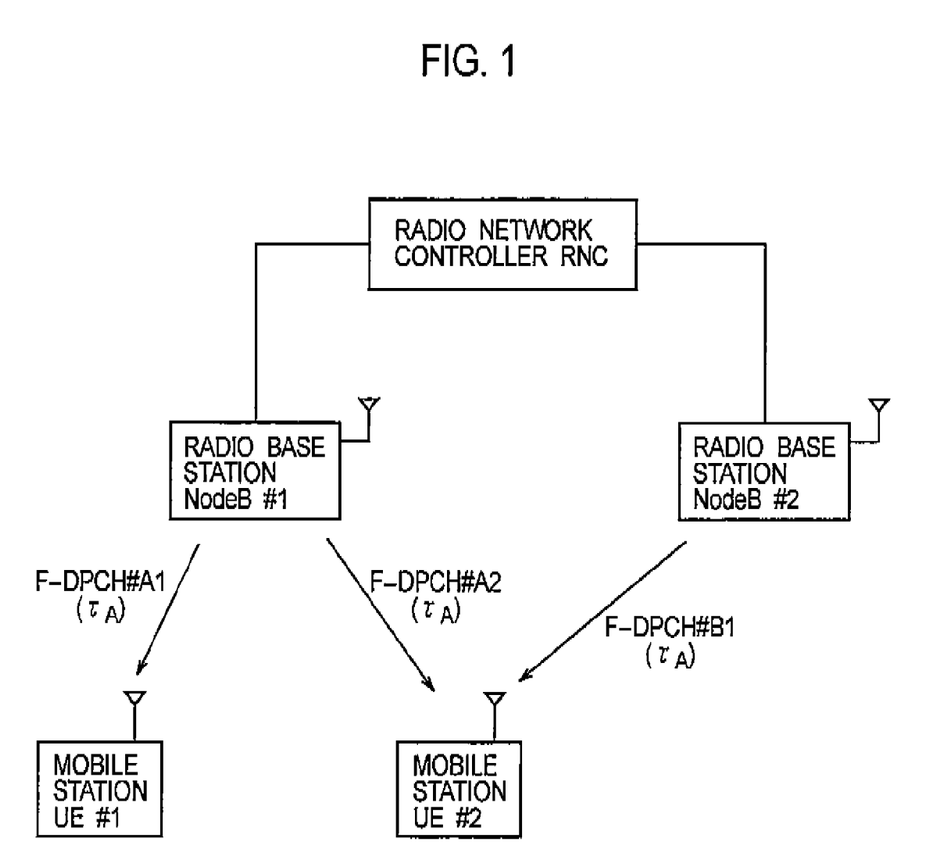
FIG. 1 is an overall block diagram of a mobile communication system defined by 3GPP.

As shown in FIG. 1, in a mobile communication system defined in 3GPP Release 6, each of radio base stations NodeB #1 and #2 is configured to notify each of mobile stations UE #1 and UE #2 of transmission power control information via a transmission power control channel (F-DPCH: Fractional Dedicated Physical Channel), the transmission power control information used in each of mobile stations to control transmission power of uplink user data (see 3GPPTS25.211 V7.2.0).

Here, a method for notifying transmission power control information via an F-DPCH will be described with reference to FIGS. 2 to 4.

Figure 2:
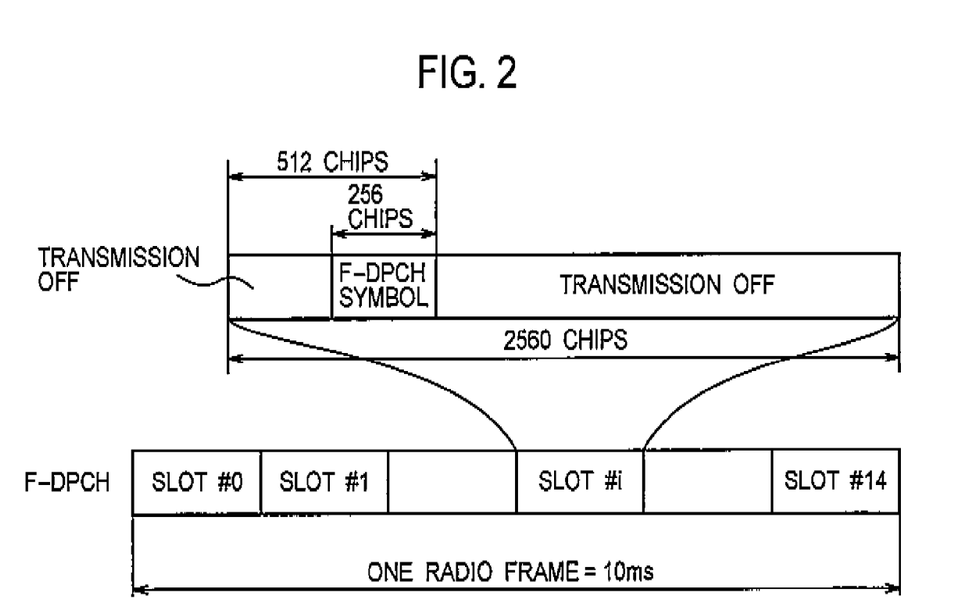
FIG. 2 is a diagram for describing a structure of an F-DPCH used in a mobile communication system defined by 3GPP.

As shown in FIG. 2, each radio frame (10 ms) in the F-DPCH is formed of 15 slots (slots #0 to #14).

Figure 3:
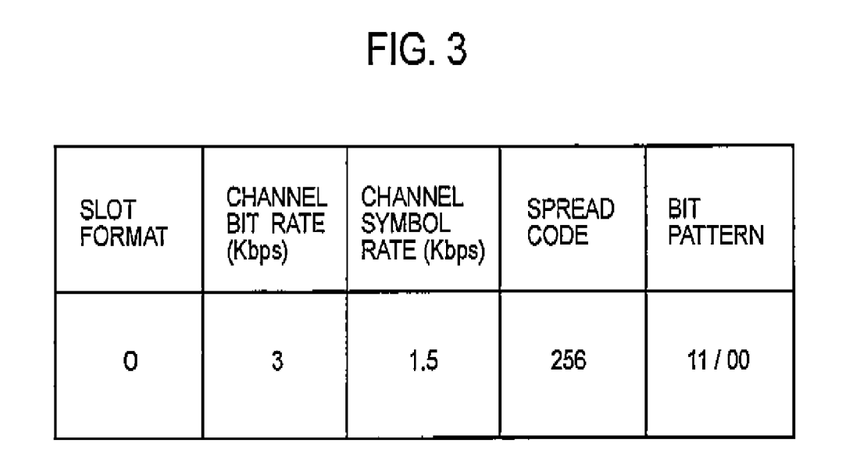

The structure of each of the slots in such a radio frame is specified by a table shown in FIG. 3.

In FIG. 3, a "slot format" shows an index for identifying the type of a format of each of the slots. In 3GPP Release 6, only one type of F-DPCH slot format is defined. However, 3GPP Release 7 supports ten types of F-DPCH slot formats specified by the difference of the offset of the F-DPCH symbol (transmission power control information) from the head of each of the slots.

A "spread code" shows how many chips form one symbol in each of the slots. As shown in FIG. 3, one symbol is formed of 256 chips in a F-DPCH slot.

A "bit pattern" shows a bit pattern transmitted in each of the slots. As shown in FIG. 3, either of "11" or "00" is transmitted in an F-DPCH slot.

A "channel bit rate" shows a bit rate in the F-DPCH. As shown in FIG. 2, only one F-DPCH symbol is transmitted in a F-DPCH slot, and 15 slots (0.66 ms) are transmitted in a radio frame of 10 ms. Accordingly, as shown in FIG. 3, the bit rate in the F-DPCH is "3 kbps (=15 slots×2 bits/10 ms)."

A "channel symbol rate" shows a symbol rate in the F-DPCH. The F-DPCH is modulated by a QPSK system. Therefore, the symbol rate in the F-DPCH is "1.5 kbps," which is a half of the bit rate in the F-DPCH.

Here, each of mobile stations UE is individually assigned an F-DPCH. In addition, each F-DPCH is specified by a channelization code unique in each sector.

Figure 4:
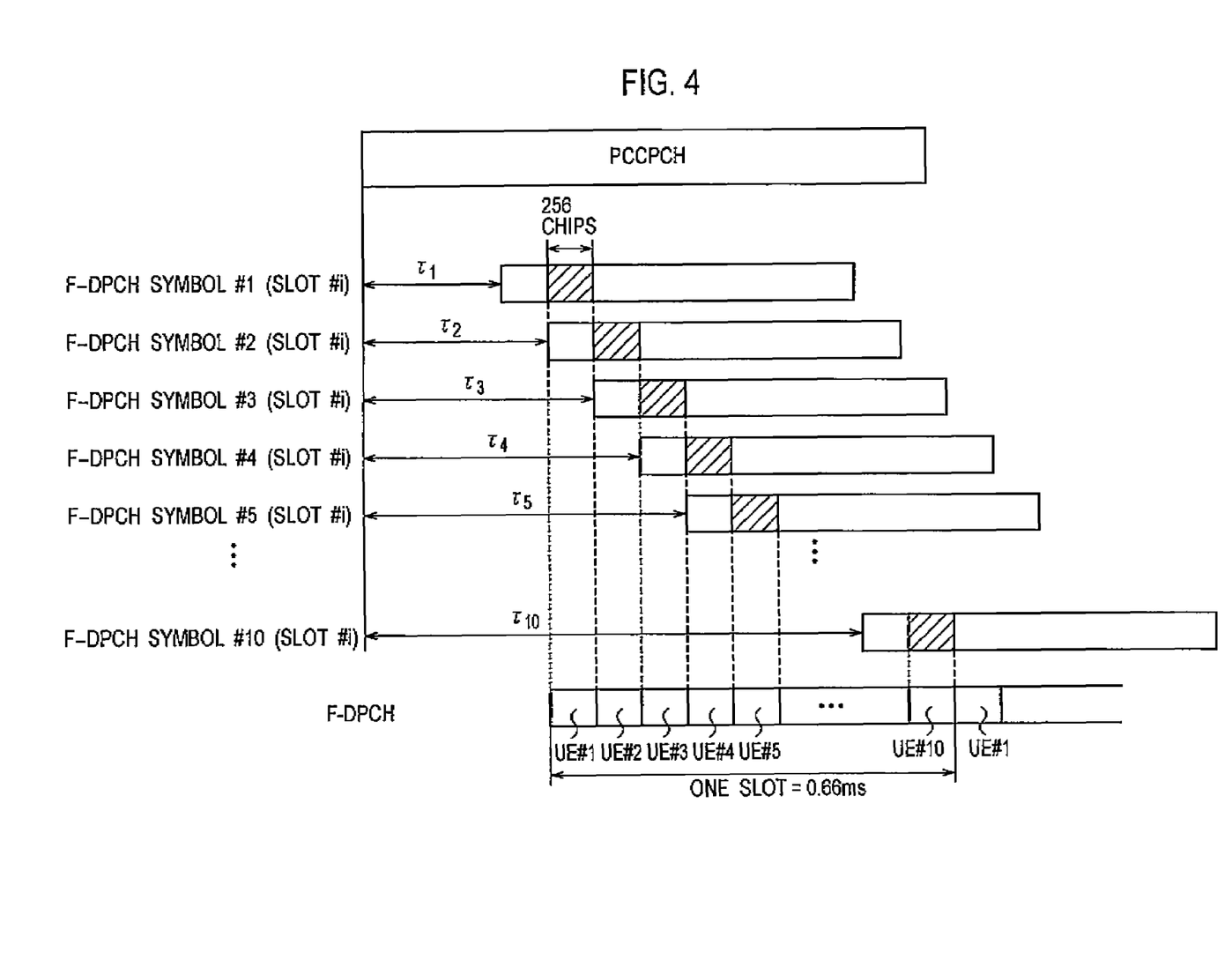
FIG. 4 is a diagram showing an example of a transmission timing of a F-DPCH symbol used in a mobile communication system defined by 3GPP.

Furthermore, as shown in FIG. 4, each F-DPCH specified by a single channelization code is shared by ten mobile stations UE #1 to #10 with time-division multiplexing.

In FIG. 4, F-DPCH symbols #1 to #10 for the mobile stations UE #1 to #10 are configured to be transmitted respectively at transmission timings $T_1$ to $T_{10}$ defined in accordance with the offsets from a PCCPCH (Primary Common Control Physical Channel).

Figure 5:
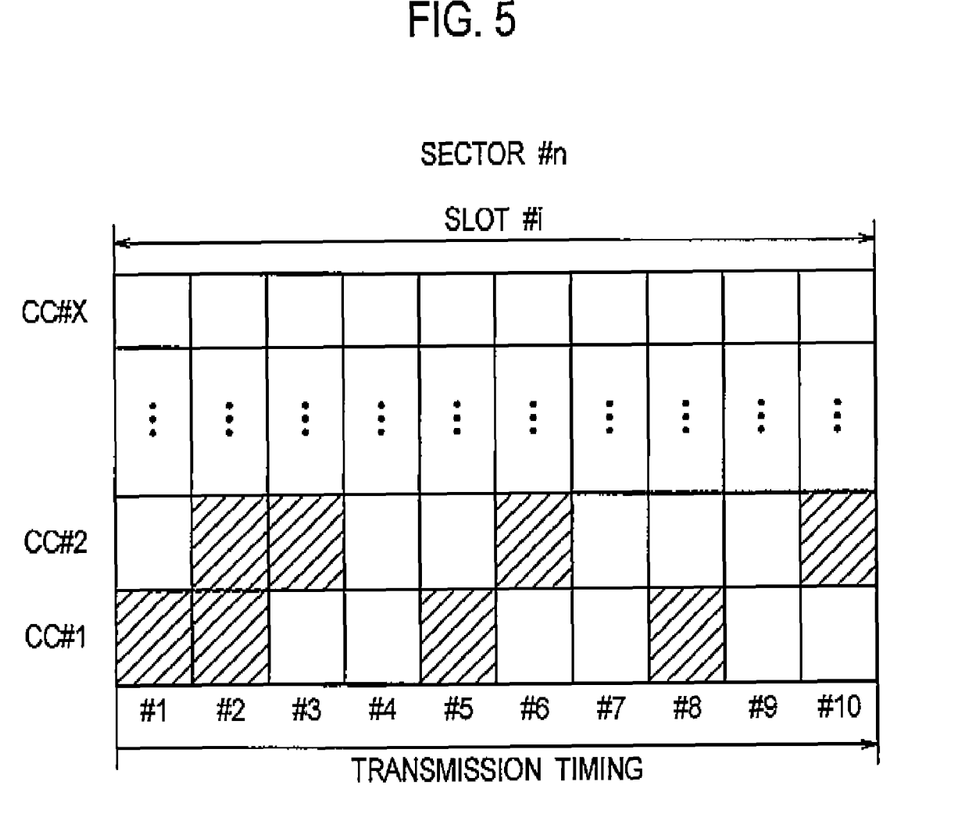
FIG. 5 is a diagram for describing a situation where a channelization code and a transmission timing used to transmit a F-DPCH symbol is assigned in a mobile communication system defined by 3GPP.

Furthermore, with reference to FIG. 5, a description will be given of a method for assigning a channelization code (CC) and a transmission timing for transmitting a F-DPCH symbol to a mobile station UE in a mobile communication system defined in 3GPP.

For example, consider a case where a mobile station UE starts communication via a radio base station NodeB #1 in a sector #n. To handle this case, as shown in FIG. 5, a radio network controller RNC is configured to randomly select a transmission timing #6 from the transmission timings usable in a smallest channelization code CC#1 having a smallest identification number among usable channelization codes in the specific sector, and to assign the smallest channelization code CC#1 and the transmission timing #6 to the mobile station UE.

In addition, consider another case where the mobile station UE adds a radio link with the radio base station NodeB #1 in the sector #n or NodeB #2 in another sector #n+1. To handle this case, the radio network controller RNC is configured to assign the smallest channelization code CC #1 and the transmission timing #6 for a F-DPCH when the aforementioned communication starts.

However, the aforementioned mobile communication system has a problem when the mobile station UE #2 performs handover from the sector #B1 of the radio base station NodeB #2 to the sector #A2 of the radio base station NodeB #1, as shown in FIG. 1. More specifically, in this case, if a transmission timing $_{TA}$ and a smallest channelization code CC #1 that are assigned to the mobile station UE #2 before the handover are also assigned to the mobile station UE #1 in the sector "A2 of the radio base station NodeB #1, a F-DPCH symbol transmitted to the mobile station UE #1 collides with a F-DPCH symbol transmitted to the mobile station UE #2.

SUMMARY OF THE INVENTION

A first aspect of the present invention is summarized as a mobile communication method for notifying a mobile station of transmission power control information by a radio base station via a transmission power control channel, the transmission power control information used in the mobile station to control transmission power of uplink user data. The mobile communication method includes: (A) assigning, at a radio network controller, a channelization code and a transmission timing for the mobile station on the basis of a status of use of a channelization code and a transmission timing in a sector other than a specific sector when the mobile station sets a radio link with the radio base station in the specific sector; and (B) notifying, from the radio base station, the mobile station of the transmission power control information via the transmission power control channel using the channelization code and the transmission timing assigned at the radio network controller.

A second aspect of the present invention is summarized as a mobile communication system configured to cause a radio base station to notify a mobile station of transmission power control information via a transmission power control channel, the transmission power control information used in the mobile station to control transmission power of uplink user data. The mobile communication system includes a radio network controller. The radio network controller includes an assignment unit configured to assign a channelization code and a transmission timing for the mobile station on the basis of a status of use of a channelization code and a transmission timing in a sector other than a specific sector when the mobile station sets a radio link with the radio base station in the specific sector. The radio base station is configured to notify the mobile station of the transmission power control information via the transmission power control channel by use of the channelization code and the transmission timing, which are assigned by the assignment unit of the radio network controller.

In the second aspect of the present invention, the assignment unit is configured to randomly select a first transmission timing usable in a smallest channelization code having a smallest identification number among channelization codes usable in the specific sector, and the assignment unit is configured to assign the first transmission timing and the smallest channelization code as the transmission timing and the channelization code for the mobile station, in a case where the first transmission timing is usable in all of the channelization codes in all of the sectors under the control of the radio network controller.

In the second aspect of the present invention, the assignment unit is configured to randomly select again a second transmission timing usable in the smallest channelization code in the specific sector, in a case where the first transmission timing is unusable at least in one of all of the channelization codes in all of the sectors under the control of the radio network controller, and the assignment unit is configured to assign the second transmission timing and the smallest channelization code as the transmission timing and the channelization code for the mobile station.

In the second aspect of the present invention, the assignment unit is configured to select a combination of a channelization code and a transmission timing in the specific sector that are least frequently used in all of the sectors under the control of the radio network controller, in a case where the first transmission timing is unusable at least in one of all of the channelization codes in all of the sectors under the control of the radio network controller, and the assignment unit is configured to assign the combination of the channelization code and the transmission timing that are least frequently used in all of the sectors under the control of the radio network controller, as the channelization code and the transmission timing for the mobile station.

A third aspect of the present invention is summarized as a radio network controller used in a mobile communication system configured to cause a radio base station to notify a mobile station of transmission power control information via a transmission power control channel by use of a channelization code and a transmission timing that are assigned by the radio network controller, the transmission power control information used in the mobile station to control transmission power of uplink user data. The radio network controller includes: an assignment unit configured to assign the channelization code and the transmission timing for the mobile station on the basis of a status of use of a channelization code and a transmission timing in a sector other than a specific sector when the mobile station sets a radio link with the radio base station in the specific sector.

In the third aspect of the present invention, the assignment unit is configured to randomly select a first transmission timing usable in a smallest channelization code having a smallest identification number among channelization codes usable in the specific sector, and the assignment unit is configured to assign the first transmission timing and the smallest channelization code as the transmission timing and the channelization code for the mobile station when the first transmission timing is usable in all of the channelization codes in all of the sectors under the control of the radio network controller.

In the third aspect of the present invention, the assignment unit is configured to randomly select again a second transmission timing usable in the smallest channelization code in the specific sector, in a case where the first transmission timing is unusable at least in one of all of the channelization codes in all of the sectors under the control of the radio network controller, and the assignment unit is configured to assign the second transmission timing and the smallest channelization code as the transmission timing and the channelization code for the mobile station.

In the third aspect of the present invention, the assignment unit is configured to select a combination of a channelization code and a transmission timing in the specific sector that are least frequently used in all of the sectors under the control of the radio network controller, in a case where the first transmission timing is unusable at least in one of all of the channelization codes in all of the sectors under the control of the radio network controller, and the assignment unit is configured to assign the combination of the channelization code and the transmission timing that are least frequently used in all of the sectors under the control of the radio network controller, as the channelization code and the transmission timing for the mobile station.

BRIEF DESCRIPTION OF THE DRAWINGS

FIG, 3 is a diagram showing a table of a structure of a slot in the F-DPCH used in a mobile communication system defined by 3GPP.

DETAILED DESCRIPTION OF THE EMBODIMENTS (Configuration of a Mobile Communication System According to a First Embodiment of the Present Invention)

A configuration of a mobile communication system according to a first embodiment of the present invention will be described with reference to FIGS. 6 and 7A to 7B.

In this embodiment, a mobile communication system defined in 3GPP Release 6 will be described by citing a mobile communication system employing EUL (Enhanced Uplink)/HSUPA (High Speed Uplink Packet Access) in particular as an example. However, it should be noted that the present invention is not limited to this example.

As shown in FIG. 1, in the mobile communication system according to the present embodiment, radio base stations NodeB #1 and #2 are configured to respectively notify, via a transmission power control channel (hereinafter, referred to as a F-DPCH), transmission power control information for controlling transmission power of uplink user data used in mobile stations UE #1 and #2 (hereinafter, referred to as a F-DPCH symbol).

Specifically, the radio base stations NodeB #1 and #2 are configured to respectively notify the mobile stations UE #1 and #2 of an F-DPCH symbol via an F-DPCH by use of a channelization code (hereinafter, referred to as a CC) and a transmission timing that are assigned by a radio network controller RNC.

The radio network controller RNC is configured to assign a CC and a transmission timing for a mobile station UE for transmitting an F-DPCH symbol when the mobile station UE sets a radio link with a radio base station NodeB in a specific sector. The radio network controller RNC is configured to assign the CC and the transmission timing on the basis of the status of use of the CC and the transmission timing in a sector other than the specific sector.

Figure 6:
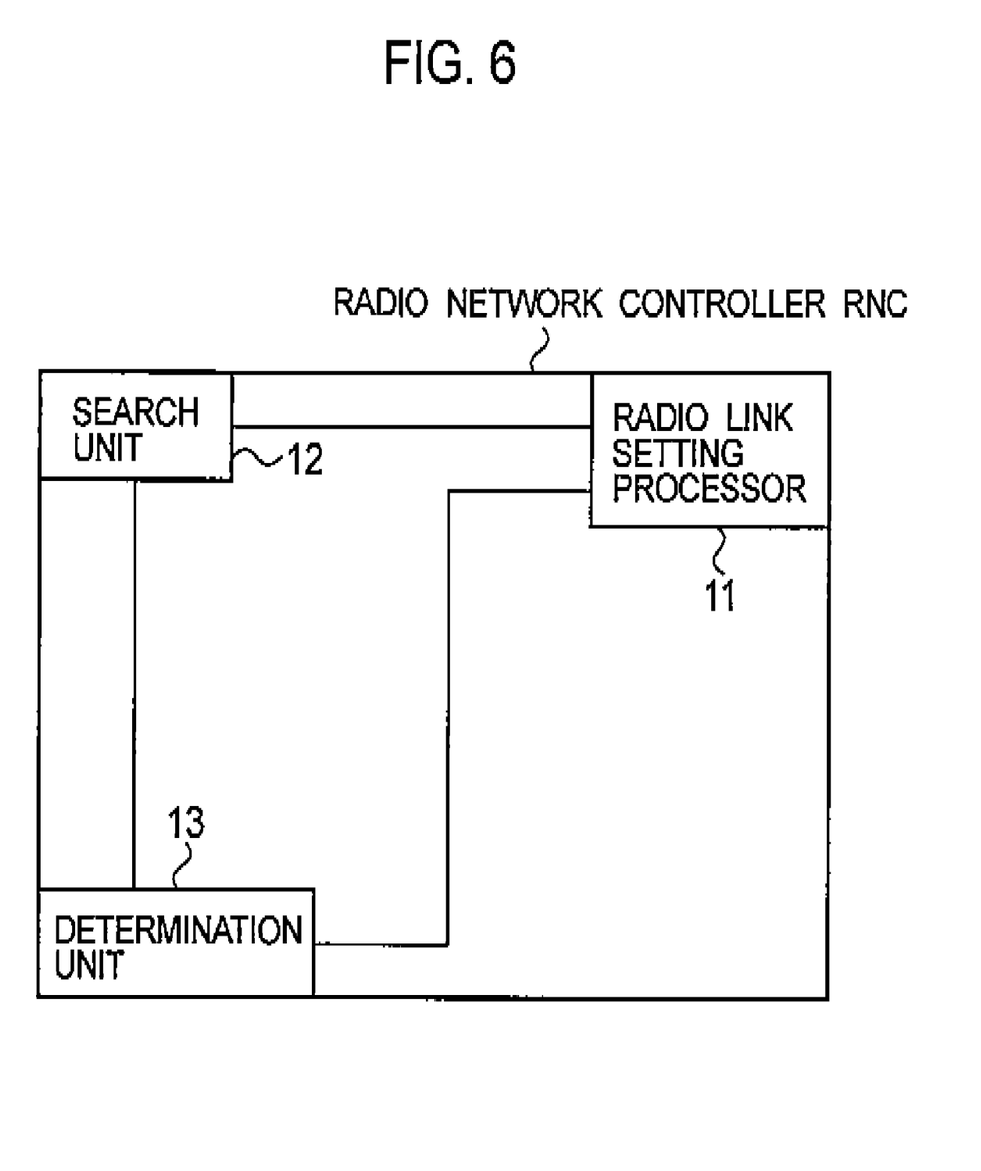
FIG. 6 is a functional block diagram of a radio network controller according to a first embodiment of the present invention.

As shown in FIG. 6, the radio network controller RNC includes a radio link setting processor 11, a search unit 12 and a determination unit 13.

The radio link setting processor 11 is configured to perform processing for setting a radio link between each of mobile stations UE and each of radio base stations (each of sectors of a radio base station).

Specifically, the radio link setting processor 11 is configured to provide information necessary for setting the radio link to each of the mobile stations UE and each of the radio base stations NodeB in accordance with a radio link setting request or the like from each of the mobile stations UE.

For example, the radio link setting processor 11 is configured to provide a CC and a transmission timing for a mobile station UE, which are assigned by the determination unit 13, to the mobile station UE and a radio base station NodeB when the mobile station UE sets a radio link with the radio base station NodeB in a specific sector (when the mobile station UE starts communications in the specific sector via the radio base station NodeB or performs handover from another sector to the specific sector, for example).

The search unit 12 is configured to randomly select a first transmission timing when a mobile station UE sets a radio link with a radio base station NodeB in a specific sector, the first transmission timing being usable in a smallest CC having a smallest identification number among the CCs usable in the specific sector.

Figure 7A:
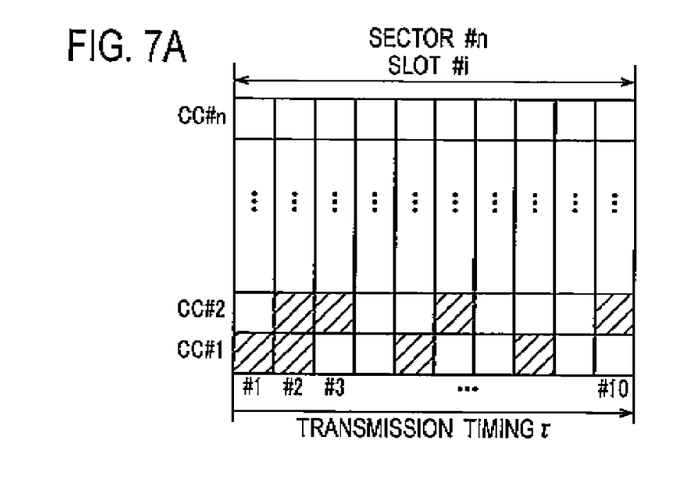
FIGS. 7A to 7B are diagrams each showing an example of a F-DPCH assignment condition in each sector of a mobile communication system according to the first embodiment of the present invention.
Figure 7B:
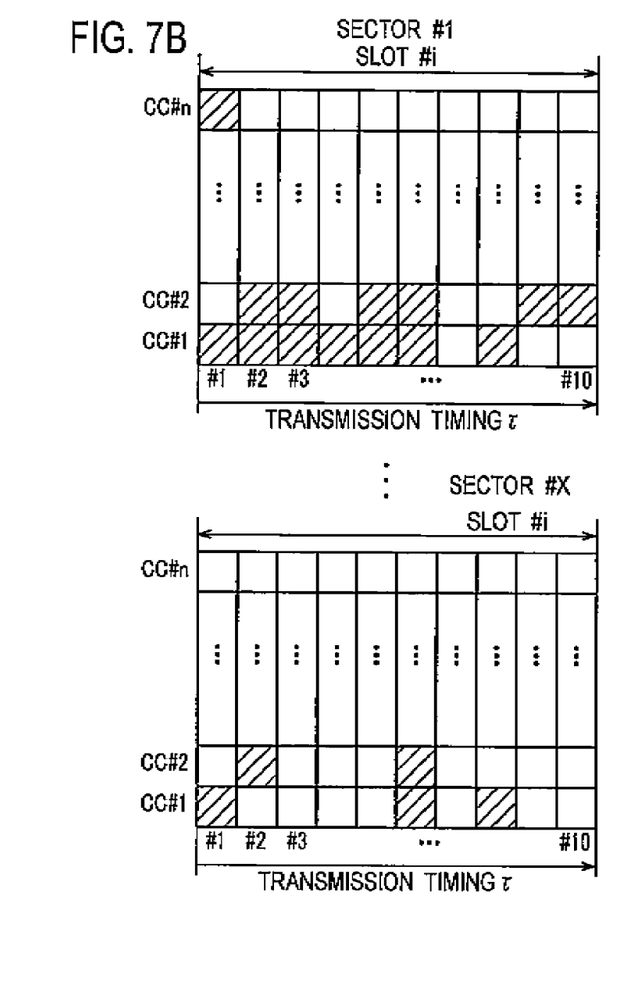

In FIGS. 7A to 7B, for example, when a mobile station UE sets a radio link with a radio base station NodeB in a sector #n, the search unit 12 selects a first transmission timing T #3 usable in a smallest CC #1 having a smallest identification number among CCs #1 to #n usable in the sector #n.

Here, the search unit 12 is configured to output the first transmission timing to the determination unit 13 when the aforementioned first transmission timing T #3 is usable in all of the CCs in all of the sectors under the control of the radio network controller RNC.

In the aforementioned configuration, the search unit 12 outputs a first transmission timing T #3 to the determination unit 13 when the first transmission timing T #3 is usable in all of the CCs in all of the sectors under the control of the radio network controller RNC.

Moreover, the search unit 12 may be configured to randomly select a second transmission timing usable in the smallest CC in the specific sector again and then to output the second transmission timing to the determination unit 13, in a case where the aforementioned first transmission timing is unusable at least in one of all of the CCs in all of the sectors under the control of the radio network controller RNC.

Here, the first transmission timing and the second transmission timing may be the same transmission timing.

In the example shown in FIGS. 7A to 7B, since the aforementioned first transmission timing T #3 is unusable at least in one of all of the CCs #1 to #n in all of the sectors #1 to #X of the radio network controller RNC, the search unit 12 selects a second transmission timing T #4 usable in the smallest CC #1 and outputs the transmission timing T #4 to the determination unit 13.

In addition, the search unit 12 may be configured to select a combination of a CC and a transmission timing that are least frequently used in all of the sectors under the control of the radio network controller RNC and then to output the combination to the determination unit 13, in a case where the aforementioned first transmission timing is unusable at least in one of all of the CCs in all of the sectors under the control of the radio network controller RNC.

In the example of FIGS. 7A to 7B, since the aforementioned first transmission timing T #3 is unusable at least in one of all of the CCs #1 to #n in all of the sectors #1 to #X under the control of the radio network controller RNC, the search unit 12 selects a combination of a CC and a transmission timing that are least frequently used in all of the sectors #1 to #X under the control of the radio network controller RNC (for example, the CC #2 and the transmission timing #8) and outputs the combination to the determination unit 13.

The determination unit 13 is configured to assign a combination of a CC and a transmission timing outputted from the search unit 12, as the CC and the transmission timing for a mobile station UE, when the mobile station UE sets a radio link with a radio base station NodeB in a specific sector.

Note that the determination unit 13 may be configured to assign, when a mobile station UE adds a radio link between itself and a radio base station NodeB in a specific sector, the CC and the transmission timing with which the mobile station UE has been assigned for the radio link already established between the mobile station UE and the radio base station NodeB, as the CC and the transmission timing for the mobile station UE for transmitting an F-DPCH symbol, unless receiving a request for changing the radio link.

(Operations of the Mobile Communication System According to the First Embodiment of the Present Invention)

Operations of the mobile communication system (specifically, the radio network controller) according to the first embodiment of the present invention will be described with reference to FIGS. 8 and 9.

Firstly, a first operation of the mobile communication system according to the present embodiment will be described with reference to FIG. 8.

Figure 8:
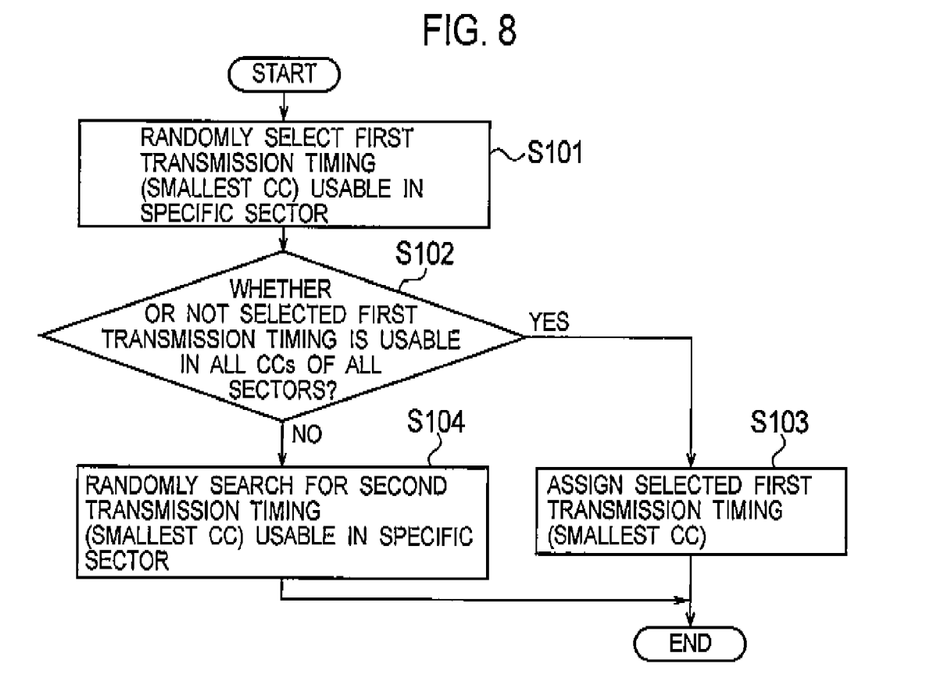
FIG. 8 is a flowchart showing operations of the mobile communication system according to the first embodiment of the present invention.

As shown in FIG. 8, in step S101, when receiving a radio link setting request (for example, a communication start request) in a specific sector from a mobile station UE, the radio network controller RNC randomly selects a first transmission timing usable in a smallest CC having a smallest identification number among the CCs usable in the specific sector.

In step S102, the radio network controller RNC determines whether or not the aforementioned first transmission timing is usable in all of the CCs in all of the sectors under the control of the radio network controller RNC.

In a case where the first transmission timing is determined to be usable, in step S103, the radio network controller RNC assigns the first transmission timing as the CC and the transmission timing used for transmitting a F-DPCH symbol to the mobile station UE.

On the other hand, in a case where the first transmission timing is determined to be unusable, in step S104, the radio network controller RNC randomly selects a second transmission timing usable in the smallest CC in the specific sector again and assigns the second transmission timing as the CC and the transmission timing used for transmitting a F-DPCH symbol to the mobile station UE.

Secondly, a second operation of the mobile communication system according to the present embodiment will be described with reference to FIG. 9.

Figure 9:
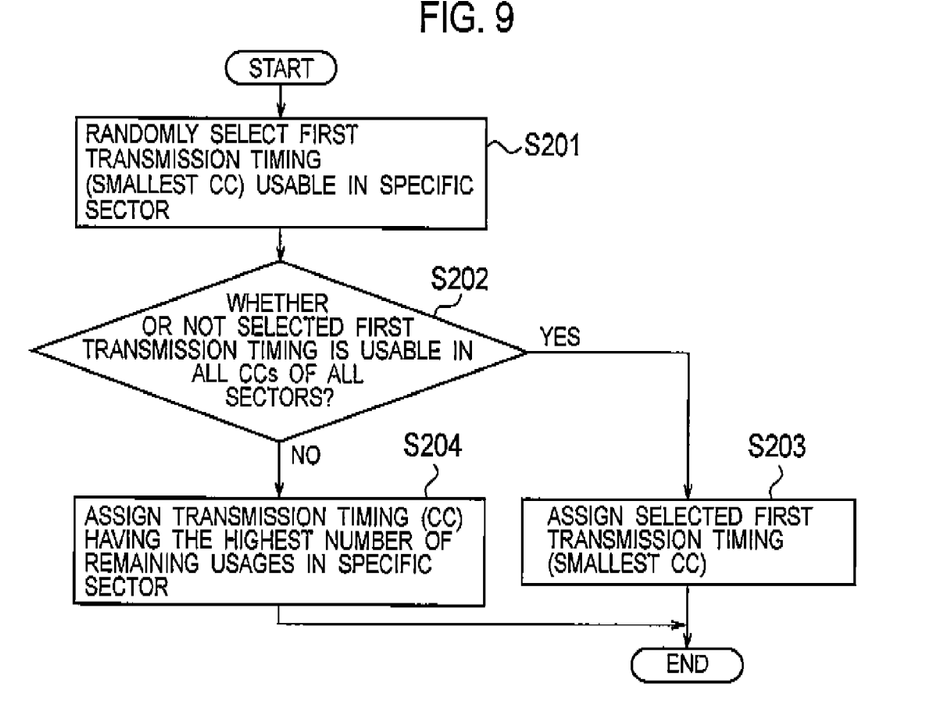
FIG. 9 is a flowchart showing operations of the mobile communication system according to the first embodiment of the present invention.

As shown in FIG. 9, in step S201, when receiving a radio link setting request (for example, a communication start request) in a specific sector from a mobile station UE, the radio network controller RNC randomly selects a first transmission timing usable in a smallest CC having a smallest identification number among the CCs usable in the specific sector.

In step S202, the radio network controller RNC determines whether or not the aforementioned first transmission timing is usable in all of the CCs in all of the sectors under the control of the radio network controller RNC.

In a case where the first transmission timing is determined to be usable, in step S203, the radio network controller RNC assigns the first transmission timing as the CC and the transmission timing used for transmitting a F-DPCH symbol to the mobile station UE.

On the other hand, in a case where the first transmission timing is determined to be unusable, in step S204, the radio network controller RNC selects a combination of a CC and a transmission timing that are least frequently used in all of the sectors under the control of the radio network controller RNC (in the highest number of remaining usages) and assigns the combination thereof as the CC and the transmission timing for transmitting a F-DPCH symbol to the mobile station UE.

(Operation and Working-Effect of the Mobile Communication System According to the First Embodiment of the Present Invention)

With the mobile communication system according to the first embodiment, when a radio link is set between a mobile station UE and a radio base station NodeB in a specific sector, a CC and a transmission timing for the mobile station UE for transmitting a F-DPCH symbol are assigned on the basis of the status of use of the CC and the transmission timing in a sector other than the specific sector. Thus, it is possible to preferably avoid a situation where a F-DPGH symbol transmitted to a mobile station UE #2 after handover to a specific sector is performed collides with a F-DPCH symbol transmitted to a mobile station UE#1 in the specific sector.

Note that the performances of the above-mentioned mobile station UE, the radio base station NodeB and the radio network controller RNC may be implemented by hardware, by a software module executed by a processor, or by a combination of the two.

The software module may be provided in a storage medium of any form such as a RAM(Random Access Memory), a flash memory, a ROM(Read Only Memory), an EPROM(Erasable Programmable ROM), an EEPROM(Electronically Erasable and Programmable ROM), a register a hard disk, a removable disk, and a CD-ROM.

The storage medium is connected to a processor so that the processor can read and write information from and to the storage medium. The storage medium may otherwise be integrated in a processor. The storage medium and the processor may be provided within an ASIC, and the ASIC may be provided in a mobile station UE, a radio base station NodeB and a radio network controller RNC. Otherwise, the storage medium and the processor may be provided in each of a mobile station UE, a radio base station NodeB and a radio network controller RNC as discrete components.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplary description and does not limit the present invention in any way.

What is claimed is:

1. A mobile communication method for notifying a mobile station of transmission power control information by a radio base station via a transmission power control channel, the transmission power control information used in the mobile station to control transmission power of uplink user data, the method comprising:
   (A) assigning, at a radio network controller, a channelization code and a transmission timing for the mobile station on the basis of a status of use of a channelization code and a transmission timing in a sector other than a specific sector when the mobile station sets a radio link with the radio base station in the specific sector;
   (B) notifying, from the radio base station, the mobile station of the transmission power control information via the transmission power control channel using the channelization code and the transmission timing assigned at the radio network controller;
   (C) randomly selecting a first transmission timing usable in a smallest channelization code having a smallest identification number among channelization codes usable in the specific sector, and
   (D) assigning the first transmission timing and the smallest channelization code as the transmission timing and the channelization code for the mobile station in a case where the first transmission timing is usable in all of the channelization codes in all of the sectors under the control of the radio network controller.

2. A mobile communication system configured to cause a radio base station to notify a mobile station of transmission power control information via a transmission power control channel, the transmission power control information used in the mobile station to control transmission power of uplink user data, the system comprising a radio network controller, wherein
   the radio network controller includes an assignment unit configured to assign a channelization code and a transmission timing for the mobile station on the basis of a status of use of a channelization code and a transmission timing in a sector other than a specific sector when the mobile station sets a radio link with the radio base station in the specific sector, and
   the radio base station is configured to notify the mobile station of the transmission power control information via the transmission power control channel by use of the channelization code and the transmission timing, which are assigned by the assignment unit of the radio network controller, wherein
   the assignment unit is configured to randomly select a first transmission timing usable in a smallest channelization code having a smallest identification number among channelization codes usable in the specific sector, and the assignment unit is configured to assign the first transmission timing and the smallest channelization code as the transmission timing and the channelization code for the mobile station in a case where the first transmission timing is usable in all of the channelization codes in all of the sectors under the control of the radio network controller.

3. The mobile communication system according to claim 2, wherein the assignment unit is configured to randomly select again a second transmission timing usable in the smallest channelization code in the specific sector, in a case where the first transmission timing is unusable at least in one of all of the channelization codes in all of the sectors under the control of the radio network controller, and the assignment unit is configured to assign the second transmission timing and the smallest channelization code as the transmission timing and the channelization code for the mobile station.

4. The mobile communication system according to claim 2, wherein the assignment unit is configured to select a combination of a channelization code and a transmission timing in the specific sector that are least frequently used in all of the sectors under the control of the radio network controller, in a case where the first transmission timing is unusable at least in one of all of the channelization codes in all of the sectors under the control of the radio network controller, and the assignment unit is configured to assign the combination of the channelization code and the transmission timing that are least frequently used in all of the sectors under the control of the radio network controller, as the channelization code and the transmission timing for the mobile station.

5. A radio network controller used in a mobile communication system configured to cause a radio base station to notify a mobile station of transmission power control information via a transmission power control channel by use of a channelization code and a transmission timing that are assigned by the radio network controller, the transmission power control information used in the mobile station to control transmission power of uplink user data, the controller comprising:

an assignment unit configured to assign the channelization code and the transmission timing for the mobile station on the basis of a status of use of a channelization code and a transmission timing in a sector other than a specific sector when the mobile station sets a radio link with the radio base station in the specific sector, wherein the assignment unit is configured to randomly select a first transmission timing usable in a smallest channelization code having a smallest identification number among channelization codes usable in the specific sector, and the assignment unit is configured to assign the first transmission timing and the smallest channelization code as the transmission timing and the channelization code for the mobile station, in a case where the first transmission timing is usable in all of the channelization codes in all of the sectors under the control of the radio network controller.

6. The radio network controller according to claim 5, wherein the assignment unit is configured to randomly select again a second transmission timing usable in the smallest channelization code in the specific sector, in a case where the first transmission timing is unusable at least in one of all of the channelization codes in all of the sectors under the control of the radio network controller, and the assignment unit is configured to assign the second transmission timing and the smallest channelization code as the transmission timing and the channelization code for the mobile station.

7. The radio network controller according to claim 5, wherein the assignment unit is configured to select a combination of a channelization code and a transmission timing in the specific sector that are least frequently used in all of the sectors under the control of the radio network controller, in a case where the first transmission timing is unusable at least in one of all of the channelization codes in all of the sectors under the control of the radio network controller, and the assignment unit is configured to assign the combination of the channelization code and the transmission timing that are least frequently used in all of the sectors under the control of the radio network controller, as the channelization code and the transmission timing for the mobile station.

* * * * *